(12) United States Patent
Carpenedo et al.

(10) Patent No.: US 12,520,763 B2
(45) Date of Patent: Jan. 13, 2026

(54) SUGARCANE HARVESTER WITH IMPROVED EXTRACTOR ASSEMBLY NEAR CHOPPING SECTION

(71) Applicant: AGCO DO BRASIL SOLUÇÕES AGRÍCOLAS LTDA, Ribeireo Preto (BR)

(72) Inventors: Marcelo Carpenedo, Canoas (BR); Fabio Luiz Spessoto Persoli, Canoas (BR); Andre Dias, Canoas (BR)

(73) Assignee: AGCO do Brasil Solucoes Agricolas Ltda., Ribeirao Preto (BR)

( * ) Notice: Subject to any disclaimer, the term of this patent is extended or adjusted under 35 U.S.C. 154(b) by 412 days.

(21) Appl. No.: 18/257,907

(22) PCT Filed: Oct. 12, 2021

(86) PCT No.: PCT/IB2021/059321
§ 371 (c)(1),
(2) Date: Jun. 16, 2023

(87) PCT Pub. No.: WO2022/136951
PCT Pub. Date: Jun. 30, 2022

(65) Prior Publication Data
US 2024/0065161 A1    Feb. 29, 2024

(30) Foreign Application Priority Data
Dec. 21, 2020   (GB) .................................. 2020266

(51) Int. Cl.
*A01D 45/10* (2006.01)
*A01D 41/12* (2006.01)
(Continued)

(52) U.S. Cl.
CPC ......... *A01D 45/10* (2013.01); *A01D 41/1208* (2013.01); *A01D 43/08* (2013.01); *A01D 61/002* (2013.01); *A01F 12/48* (2013.01)

(58) Field of Classification Search
CPC ...... A01D 45/10; A01D 43/08; A01D 43/086; A01D 43/087; A01F 12/48
(Continued)

(56) References Cited

U.S. PATENT DOCUMENTS 3,673,774 A * 7/1972 Mizzi .................... A01D 45/10
                                                            56/60
4,089,396 A   5/1978 Quick
(Continued)

FOREIGN PATENT DOCUMENTS

BR       PI0505161  A    8/2007
BR       MU8800895  U2   10/2010
(Continued)

OTHER PUBLICATIONS

European Patent Office, Search report for related PCT Application No. PCT/IB2021/059321, dated Oct. 12, 2021, 7 pages.
(Continued)

*Primary Examiner* — Monica L Perry

(57) ABSTRACT

A sugarcane harvester includes an extractor assembly that more efficiently and effectively separates leaves, stems, and other waste material from sugarcane billets and ejects the waste material back onto sugarcane fields without blowing the waste material into a wagon or other billet collection vehicle.

20 Claims, 11 Drawing Sheets

(51) Int. Cl.
*A01D 43/08* (2006.01)
*A01D 61/00* (2006.01)
*A01F 12/48* (2006.01)

(58) Field of Classification Search
USPC .......................................................... 56/12.8
See application file for complete search history.

(56) References Cited

U.S. PATENT DOCUMENTS

| | | | | |
|---|---|---|---|---|
| 4,121,778 A * | 10/1978 | Quick | ..................... | A01D 45/10 56/16.5 |
| 4,129,339 A * | 12/1978 | Quick | ..................... | A01D 45/10 406/165 |
| 4,574,567 A * | 3/1986 | Morellini | ............... | A01D 45/10 56/16.5 |
| 4,924,662 A * | 5/1990 | Quick | ..................... | A01D 45/10 56/122 |
| 5,069,024 A * | 12/1991 | Riberio Pinto | ........ | A01D 45/10 56/12.8 |
| 5,092,110 A * | 3/1992 | Dommert | ............... | A01D 45/10 56/16.5 |
| 5,488,820 A * | 2/1996 | Cannavan | ............... | A01D 45/10 56/504 |
| 5,816,036 A | 10/1998 | Caillouet | | |
| 5,953,891 A * | 9/1999 | Leigers | ................. | A01D 45/10 460/99 |
| 6,500,062 B1 * | 12/2002 | Harris | ...................... | B07B 4/02 460/79 |
| 6,869,356 B2 * | 3/2005 | Hinds | .................... | A01D 45/10 460/70 |
| 8,955,402 B2 * | 2/2015 | Quaderer | ............... | A01D 45/10 73/865.8 |
| 9,119,346 B2 * | 9/2015 | Vergote | .................. | A01D 45/10 |
| 10,194,589 B2 * | 2/2019 | Almeida | ................. | A01D 57/00 |
| 10,485,170 B2 * | 11/2019 | Nicora | ................... | B07B 4/025 |
| 10,492,370 B2 * | 12/2019 | Sechinato | ............... | A01F 12/48 |
| 12,029,165 B2 * | 7/2024 | Craig | ..................... | A01D 43/08 |
| 12,342,757 B2 * | 7/2025 | Roberge | ................ | A01D 43/08 |
| 2017/0112063 A1 | 4/2017 | Craig | | |
| 2020/0337235 A1 * | 10/2020 | Blank | ................. | A01M 21/043 |
| 2021/0400876 A1 | 12/2021 | Murray et al. | | |

FOREIGN PATENT DOCUMENTS

| | | |
|---|---|---|
| CN | 103621251 B | 11/2015 |
| EP | 3501283 A1 | 6/2019 |
| SU | 614768 A1 | 7/1978 |
| WO | 2018037543 A1 | 3/2018 |
| WO | 2019173256 A1 | 9/2019 |

OTHER PUBLICATIONS

UK Intellectual Property Office, Search report for related UK Application No. GB2020266.9, dated May 26, 2021, 4 pages.

* cited by examiner

SUGARCANE HARVESTER WITH IMPROVED EXTRACTOR ASSEMBLY NEAR CHOPPING SECTION

RELATED APPLICATIONS

This application is a national stage application under 35 U.S.C. 371 of International Patent Application No. PCT/IB2021/059321, filed on Oct. 12, 2021, which claims the benefit of U.K. Application No. 2020266.9, filed Dec. 21, 2020, both of which are hereby incorporated by reference in their entirety.

BACKGROUND

Sugarcane harvesters are large, moveable, agricultural machines that harvest and partially process sugarcane. Typical sugarcane harvesters cut sugarcane stalks from sugarcane plants as they move through the plants, strip the leaves from the sugarcane stalks, and cut the sugarcane stalks into billets. Conveyor assemblies mounted on the harvesters then elevate the billets and drop them into wagons or other collection vehicles that travel behind the harvesters.

Sugarcane harvesters also typically include one or more extractors that separate leaves, stems, and other waste material from the billets and eject the waste material back onto the sugarcane fields where it acts as fertilizer. Conventional extractors include high powered fans or blowers that direct pressurized air at the billets as the billets are carried upwardly on the conveyor assemblies. These extractor fans are inefficient, loud, and often fail to separate and remove much of the waste material from the billets. Moreover, the fans often blow some of the waste material into the collection wagons where it again mingles with the sugarcane billets, requiring subsequent removal once the billets are delivered to a sugarcane mill.

SUMMARY

The present invention solves at least some of the above-described problems and related problems and provides a distinct advance in the art of sugarcane harvesters. More particularly, the invention provides a sugarcane harvester with an improved extractor assembly that more efficiently and effectively separates leaves, stems, and other waste material from sugarcane billets without blowing the waste material into a wagon or other billet collection vehicle.

A sugarcane harvester constructed in accordance with an embodiment of the invention broadly comprises an intake and cutting assembly; a chopping section; an internal storage reservoir, a discharge assembly, and the above-mentioned extractor assembly. These components and other components may be mounted on a moveable chassis driven by one or more engines.

The intake and cutting assembly cuts sugarcane stalks from sugarcane plants as the sugarcane harvester moves through the plants. The intake and cutting assembly may include a topper to cut off the leafy top portions of the sugarcane plants, one or more crop divider scrolls to divide and separate the sugarcane plants, one or more knockdown rollers to knock down the sugarcane plants, a base cutter assembly to sever sugarcane stalks from the sugarcane plants, and a feed section to feed the sugarcane stalks rearwardly to the chopping section.

The chopping section receives the sugarcane stalks from the intake and cutting assembly and chops or otherwise cuts the sugarcane stalks into billets. The chopping section then projects the billets rearwardly such that they are temporarily suspended in air before landing in the storage reservoir.

The storage reservoir is positioned between the chopping section and the discharge assembly for receiving billets from the chopping section and storing a quantity of the billets before they are discharged from the harvester.

The discharge assembly is positioned at or near the rear of the harvester, receives the sugarcane billets from the storage reservoir, and discharges the billets into a wagon or other storage vehicle that travels alongside the harvester. An embodiment of the discharge assembly broadly comprises an elevator and a discharge conveyor.

The elevator receives the billets from the storage reservoir, lifts the billets to an elevated position, and projects the billets onto the conveyor. In one embodiment, the elevator lifts the billets vertically about an elevator axis that is substantially perpendicular to the longitudinal axis of the harvester and projects the billets onto the conveyor such that the billets are temporarily suspended in air until falling onto the conveyor.

The discharge conveyor receives the billets from the elevator and discharges the billets to a wagon or other storage vehicle or mechanism following the harvester. In one embodiment, the discharge conveyor moves the billets horizontally along a conveyor axis that is substantially perpendicular to both the elevator axis and the longitudinal axis of the harvester. The extractor assembly includes several fans or blowers strategically sized and positioned on the harvester to more efficiently and effectively separate leaves, stems, and other waste material from the billets without blowing the waste material into the wagon or other billet collection vehicle following the harvester.

An embodiment of the extractor assembly comprises a fan or blower positioned between the intake and cutting assembly and the chopping section. The fan is positioned above the feed section of the intake and cutting assembly and directs pressurized air downwardly on the sugarcane stalks as they are being fed to the chopping section. This separates and removes loose leaves, stems, and other waste material from the sugarcane stalks before the waste material enters and potentially clogs the blades in the chopping section. The fan then directs the separated waste material below the harvester into the sugarcane field.

An embodiment of the discharge assembly also includes a fan or blower positioned between the chopping section and the storage reservoir. The fan directs pressurized air upwardly into the billets as they are suspended in air between the chopping section and the reservoir. The air then directs the waste material through vents in the rear of the harvester. Because the pressurized air is directed at the billets as they are suspended in air rather than when they are supported on a conveyor or other solid surface, the air more thoroughly and efficiently separates and removes loose leaves, stems, and other waste material from the billets. This permits use of a smaller, quieter, more energy efficient fan.

An embodiment of the discharge assembly also includes ductwork that captures exhaust air from an engine cooling fan and directs the pressurized air into the stream of waste material separated from the billets with the fan described in the previous paragraph. This helps direct the waste material rearwardly through vents in the rear of the harvester.

An embodiment of the discharge assembly also includes a fan or blower positioned near the outlet of the elevator. The fan directs pressurized air upwardly into the billets as they are suspended in air between the elevator and the conveyor. The air then directs the waste material rearwardly away from the conveyor and any wagons or other collection vehicles collecting billets from the conveyor. Because the pressurized air is directed at the billets as they are suspended in air between the elevator and the conveyor rather than when they are supported on a conveyor or other solid surface, the air more thoroughly and efficiently separates and removes loose leaves, stems, and other waste material from the billets. This permits use of a smaller, quieter, more energy efficient fan.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures.

Figure 1:
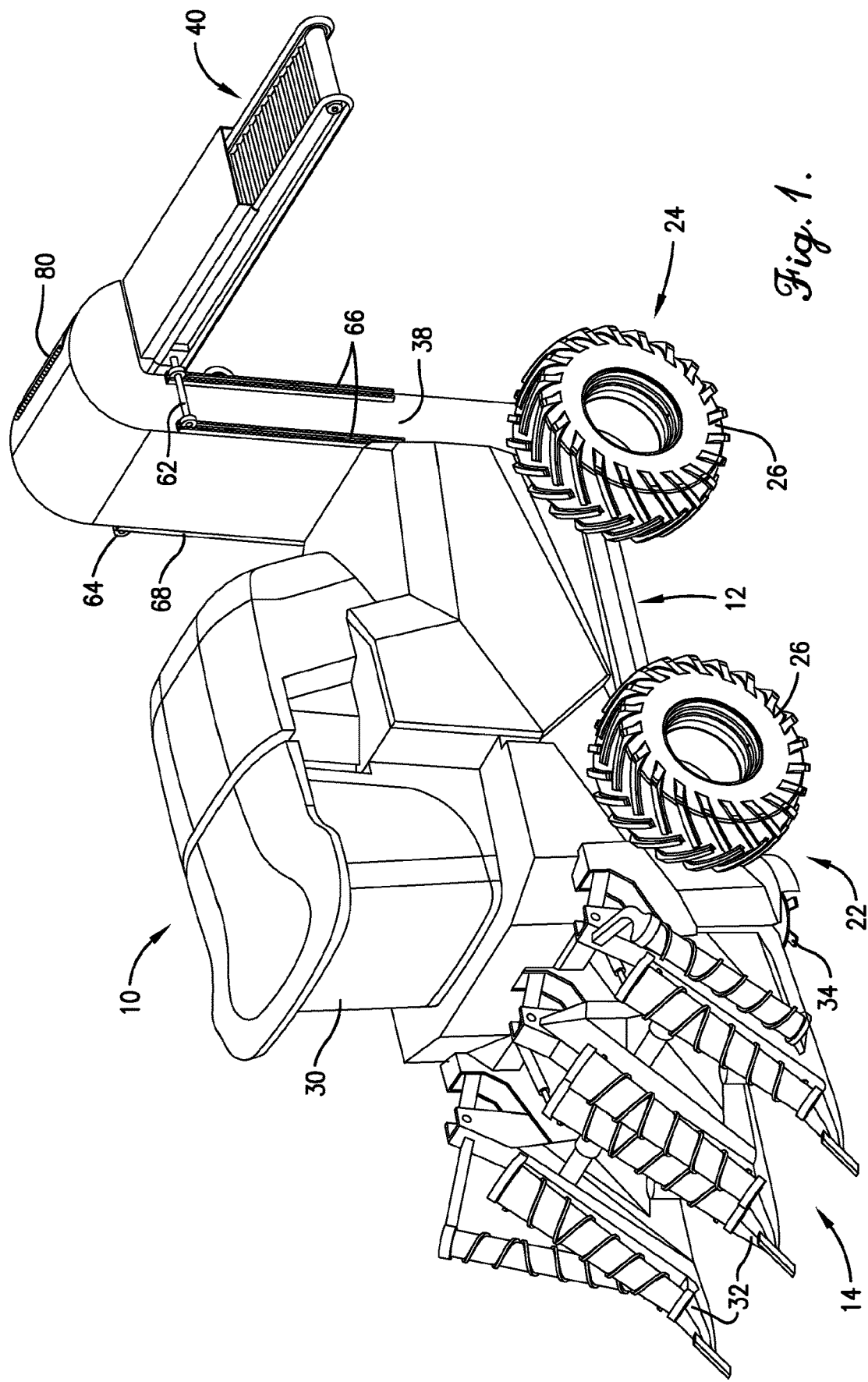
FIG. 1 is a perspective view of a sugarcane harvester constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Turning now to the drawing figures, a sugarcane harvester 10 constructed in accordance with embodiments of the invention is illustrated. As explained in more detail below, the sugarcane harvester 10 has an improved extractor assembly that more efficiently, effectively, and quietly separates leaves, stems, and other waste material from sugarcane billets and ejects the waste material back onto sugarcane fields without blowing the waste material into a wagon or other billet collection vehicle.

Figure 2:
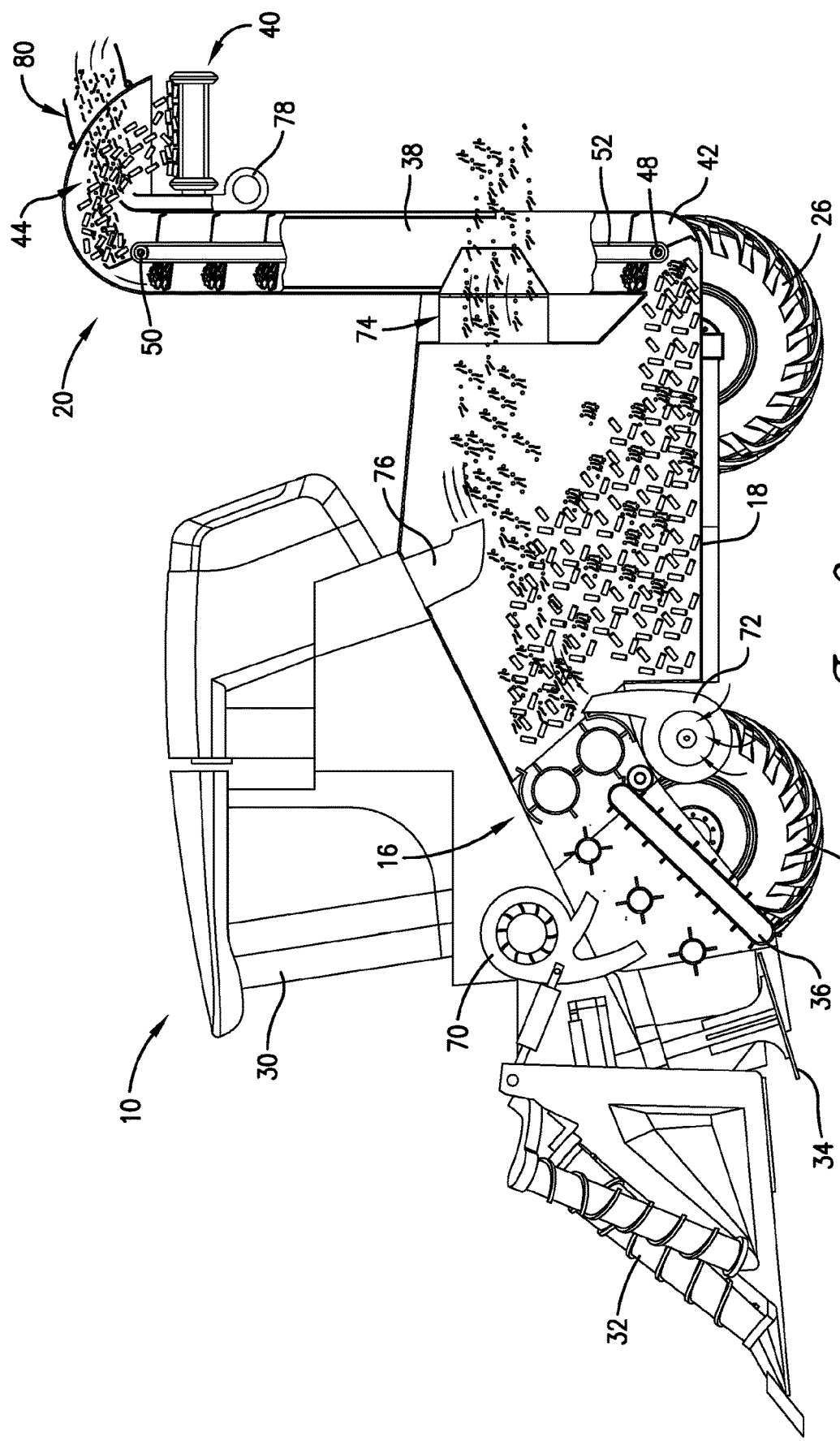
FIG. 2 is a vertical side sectional view of the sugarcane harvester depicting internal components of the harvester.

As best shown in FIGS. 1 and 2, an embodiment of the sugarcane harvester 10 broadly comprises a movable chassis 12; an intake and cutting assembly 14; a chopping section 16; an internal storage reservoir 18; a discharge assembly 20; and the above-mentioned extractor assembly. Individual components of the extractor assembly are numbered and described below.

The chassis 12 has a forward end 22 and a rearward end 24 disposed along a longitudinal axis that is essentially parallel to a ground surface over which the harvester travels. The chassis 12 rides on wheels 26, belts, or other ground-engaging traction elements that are driven by conventional engines, transmissions, and associated mechanical and electrical components. An operator's station 30 may be supported on top the chassis, although the harvester may also include various sensors and controls that provide autonomous operation without direct operator control.

The intake and cutting assembly 14 is supported on the forward end 22 of the chassis 12 for cutting sugarcane stalks from sugarcane plants as the sugarcane harvester moves through the plants. The intake and cutting assembly 14 may include a topper to cut off the leafy top portions of the sugarcane plants, one or more crop divider scrolls 32 to divide and separate the sugarcane plants, one or more knockdown rollers to knock down the sugarcane plants, one or more base cutter assemblies 34 to sever sugarcane stalks from the sugarcane plants, and a feed section 36 to feed the sugarcane stalks rearwardly to the chopping section 16.

The chopping section 16 is supported between the forward and rearward ends of the chassis 12 and receives the sugarcane stalks from the intake and cutting assembly 14 and chops or otherwise cuts the sugarcane stalks into billets. As best shown in FIG. 2, the chopping section projects the billets rearwardly such that they are temporarily suspended in air before landing in the storage reservoir 18.

The storage reservoir 18 is supported on the chassis 12 between the chopping section 16 and the discharge assembly 20 for storing a quantity of the billets before they are discharged from the harvester. The storage reservoir may be a bin, tank, or any other similar storage device and may be any size and shape, but it's preferably small enough to fit within the side margins of the wheels 26.

The discharge assembly 20 is positioned at or near the rear of the harvester and receives the sugarcane billets from the storage reservoir 18 and discharges the billets into a wagon or other storage vehicle that travels alongside the harvester. In one embodiment, the discharge assembly broadly comprises an elevator 38 and a discharge conveyor 40.

Figure 10:
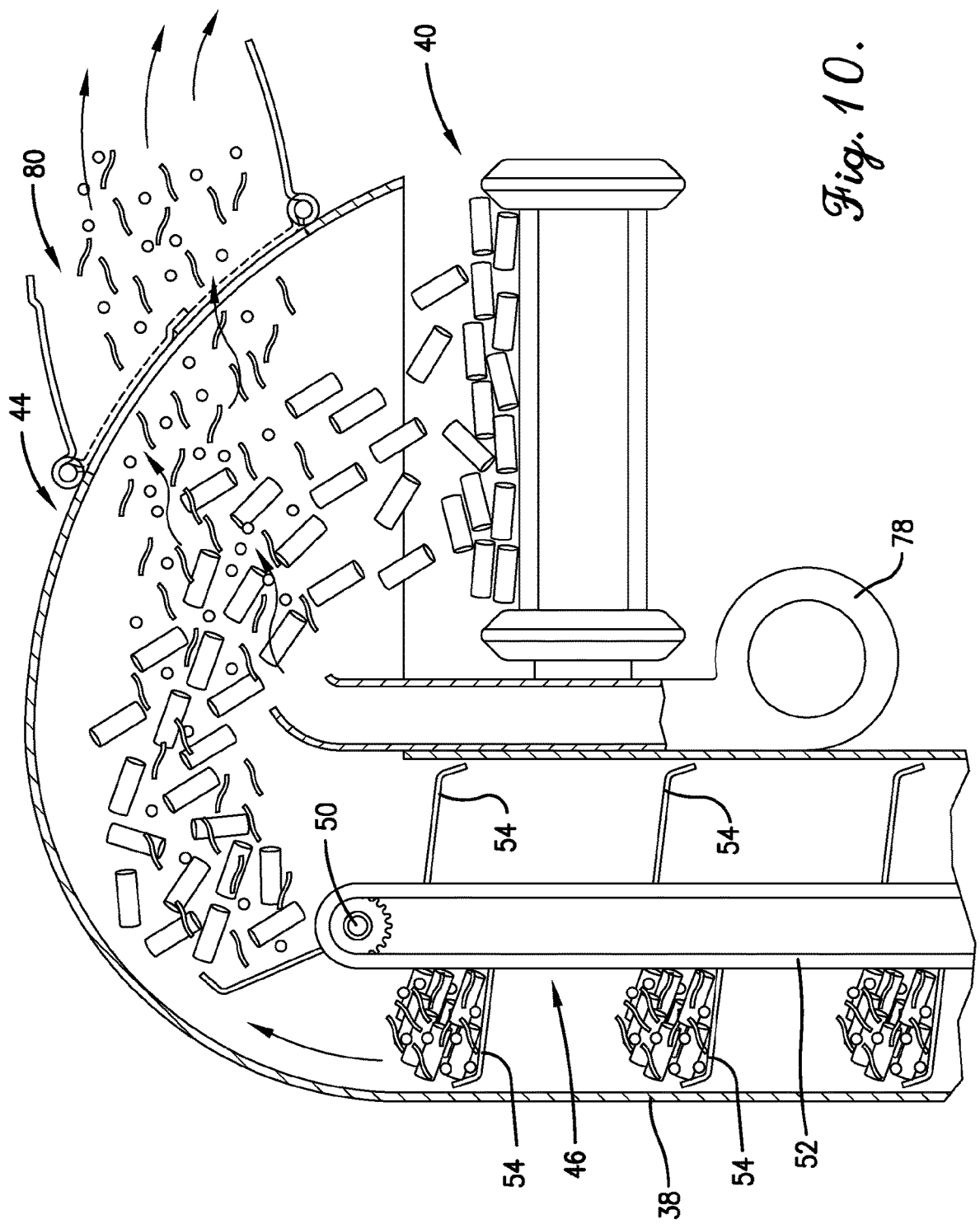
FIG. 10 is a fragmentary vertical sectional view of the elevator and the discharge conveyor of the sugarcane harvester shown discharging and conveying sugarcane billets.

The elevator 38 receives the billets from the storage reservoir 18 and lifts the billets to an elevated position. In one embodiment, the elevator 38 lifts the billets vertically about an elevator axis that is substantially perpendicular to the longitudinal axis of the harvester. As best shown in FIGS. 2 and 10, the elevator 38 projects the billets rearwardly such that the billets are temporarily suspended in air until falling onto the conveyor 40.

As best shown in FIGS. 2 and 10, an embodiment of the elevator 38 includes a lower input 42, a raised output 44, and an elevating mechanism 46 that lifts the billets from the input 42 to the output 44. In one embodiment, the elevating mechanism 46 includes a pair of spaced apart rollers 48, 50, a continuous belt 52 trained over the rollers, a number of spaced lifting trays or arms 54 attached to the belt for supporting and lifting the billets, and a motor or other drive mechanism for driving the belt so as to move the lifting arms and billets upwardly from the input 42 to the output 44 and move the emptied lifting arms back down toward the input 42. The motor or other drive mechanism moves the conveyor at a speed sufficient to propel the billets onto the discharge conveyor such that they are temporarily suspended in air between the elevator and the conveyor.

Figure 3:
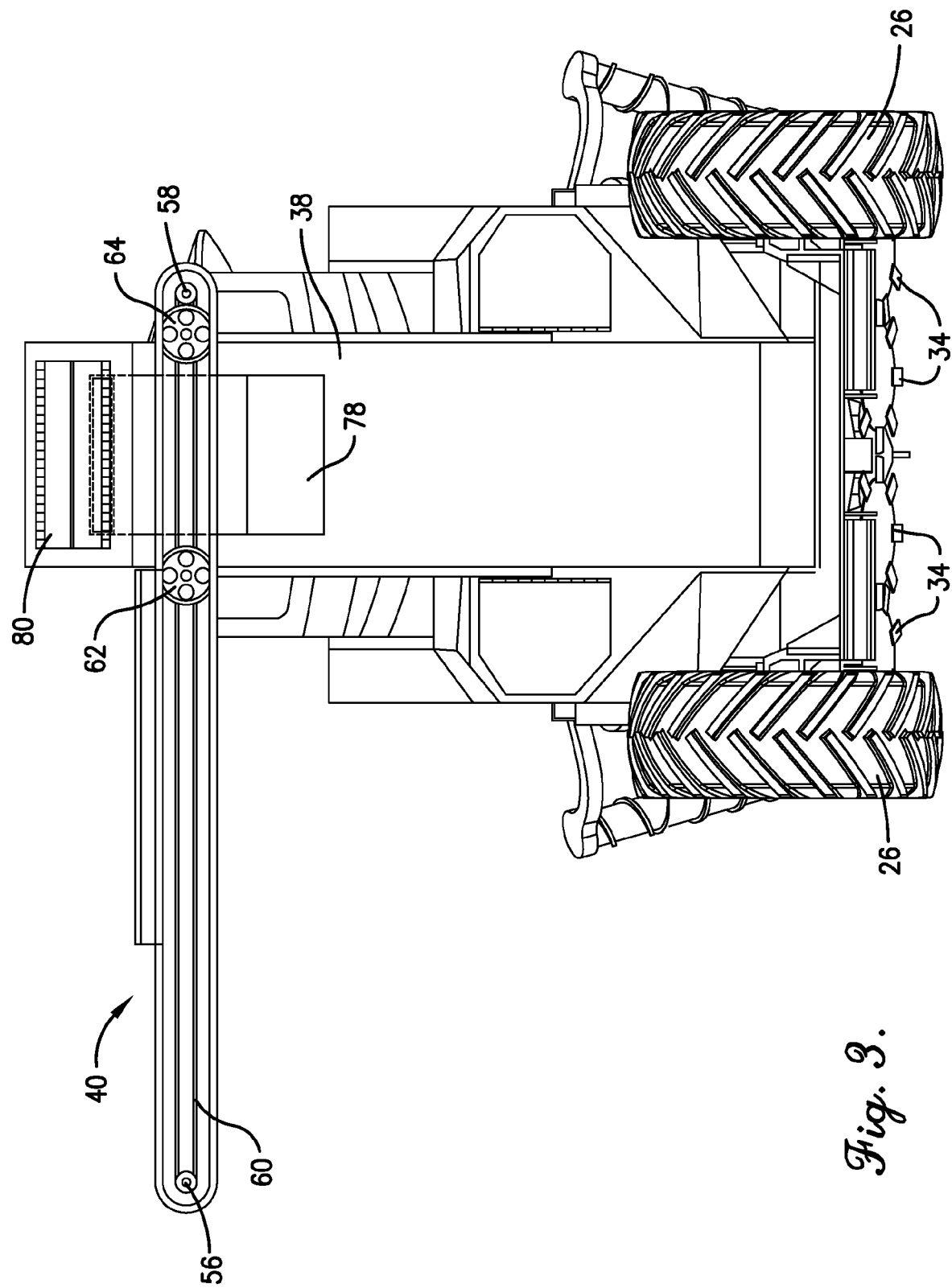
FIG. 3 is a rear view of the sugarcane harvester with its discharge conveyor shifted to its raised and leftmost position.

The discharge conveyor 40 receives the billets from the elevator 38 and discharges the billets to a wagon or other storage vehicle or mechanism following the harvester. As best shown in FIG. 3, the conveyor 40 includes a pair of spaced apart rollers 56, 58, a continuous conveyor belt 60 trained over the rollers, and a reversible motor or other drive mechanism for moving the conveyor belt leftward or rightward with respect to the harvester for allowing the discharge of the billets on a left side or a right side of the harvester. In one embodiment, the conveyor 40 moves the billets horizontally along a conveyor axis that is substantially perpendicular to both the elevator axis and the longitudinal axis of the harvester. This allows the conveyor to move and discharge the billets on either side of the harvester without taking up much space behind the harvester.

The discharge assembly 20 may also comprises height adjustment mechanism for vertically raising or lowering the conveyor. The height adjustment mechanism may comprise motors, pneumatic cylinders, actuators, or any other electrical, mechanical, electromechanical, or pneumatic components capable of raising and lowering the discharge conveyor 36 relative to other components on the harvester.

An embodiment of the height adjustment mechanism comprises a pair of moveable shafts 62, 64 that are connected to the conveyor 40 and that may move within vertically extending rails 66, 68 on opposite sides of the elevator 38. The shafts 62, 64 may be moved by motors, pneumatic cylinders, actuators, or any other electrical, mechanical, electromechanical, or pneumatic components.

The height adjustment mechanism may simultaneously raise or lower both ends of the conveyor 40 so as to maintain the horizontal orientation of the conveyor. For example, the mechanism may move the conveyor 40 between an uppermost horizontal position depicted in FIGS. 1-4 and a lowered horizontal position depicted in FIG. 5. This permits an operator to adjust the height of the discharge conveyor 40 to accommodate the discharge of billets into wagons or other storage vehicles of various different heights.

Figure 6:
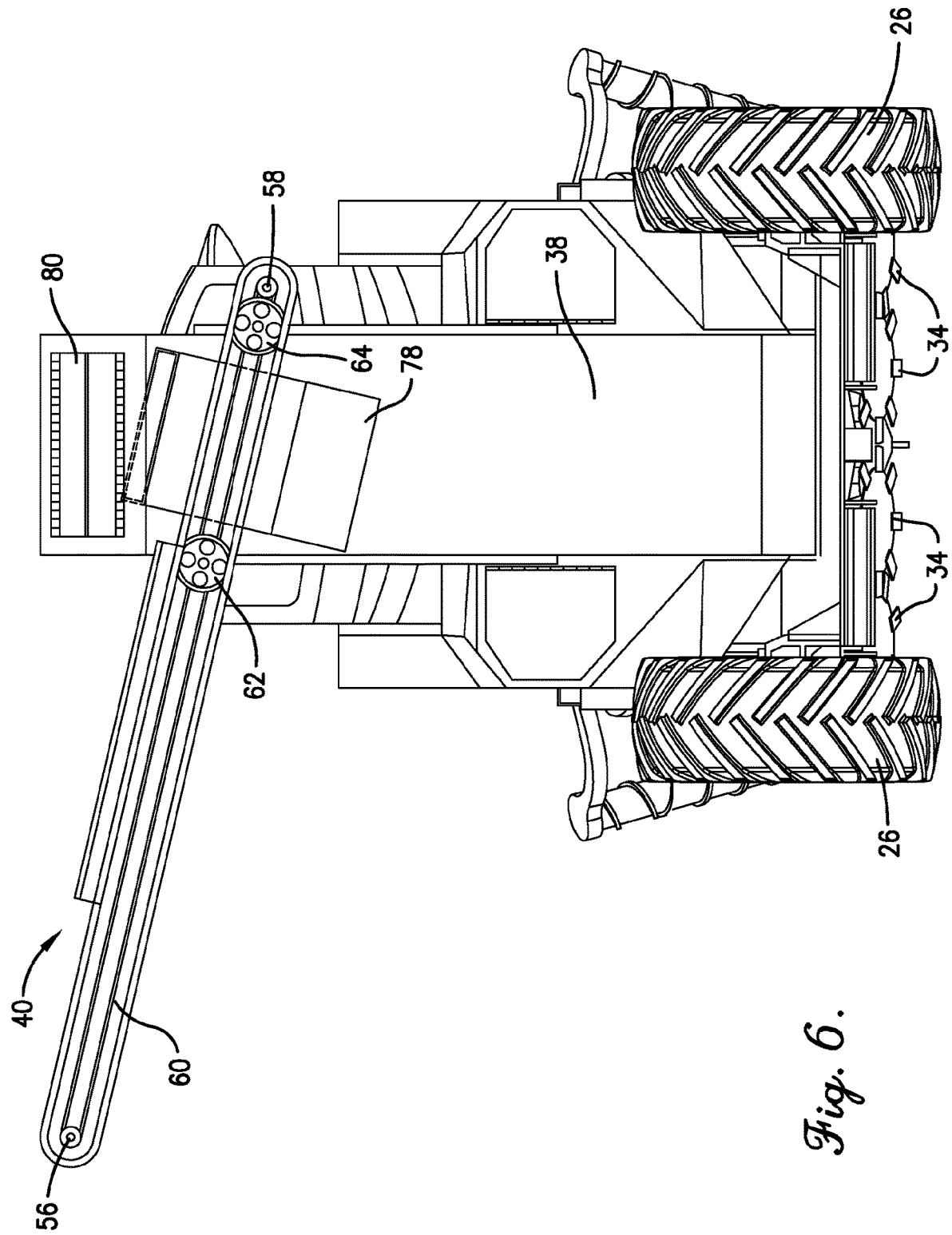
FIG. 6 is a rear view of the sugarcane harvester with its discharge conveyor shifted to its leftmost position and with its left end raised relative to its right end.
Figure 7:
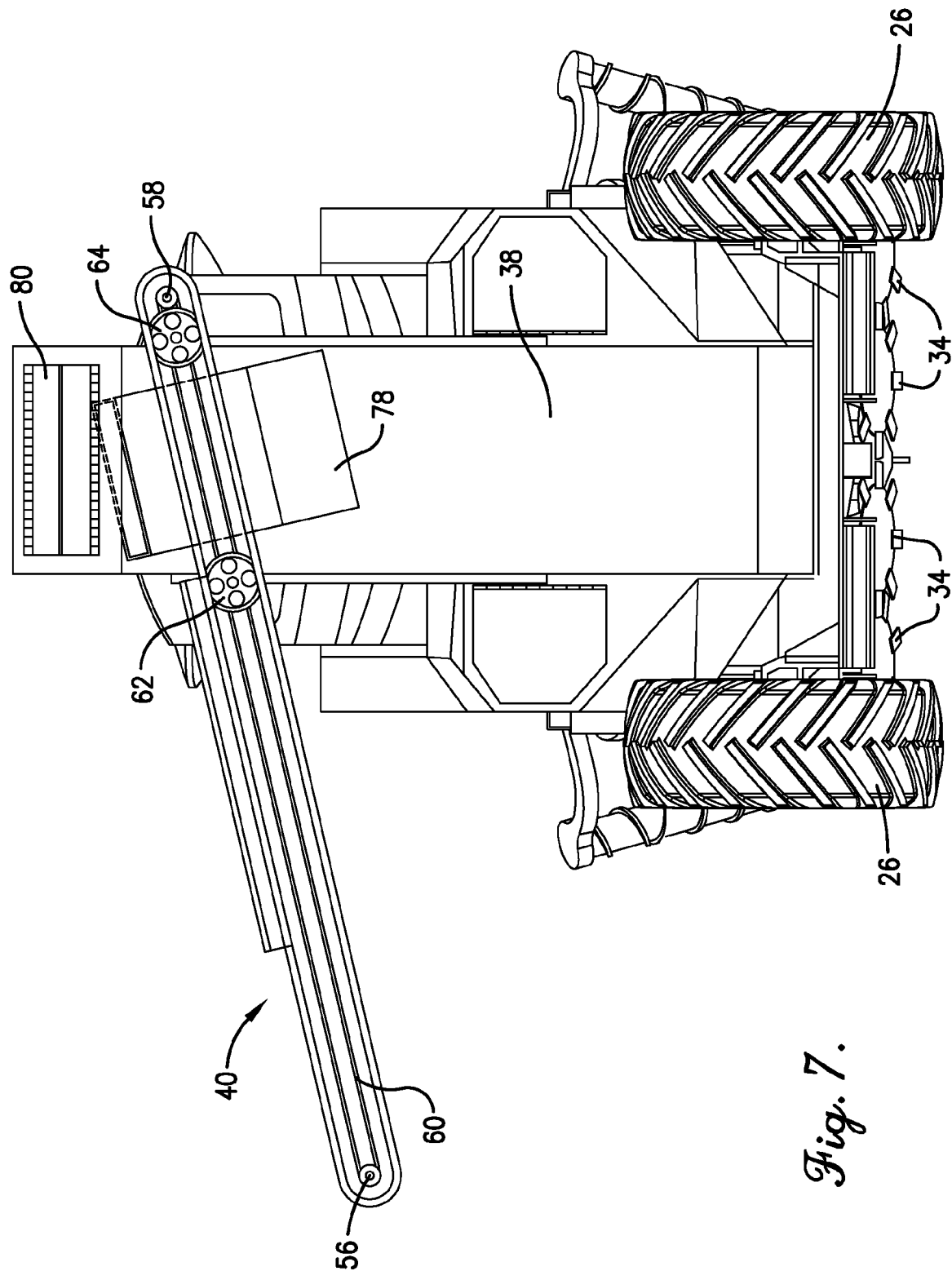
FIG. 7 is a rear view of the sugarcane harvester with its discharge conveyor shifted to its leftmost position and with its left end lowered relative to its right end.
Figure 8:
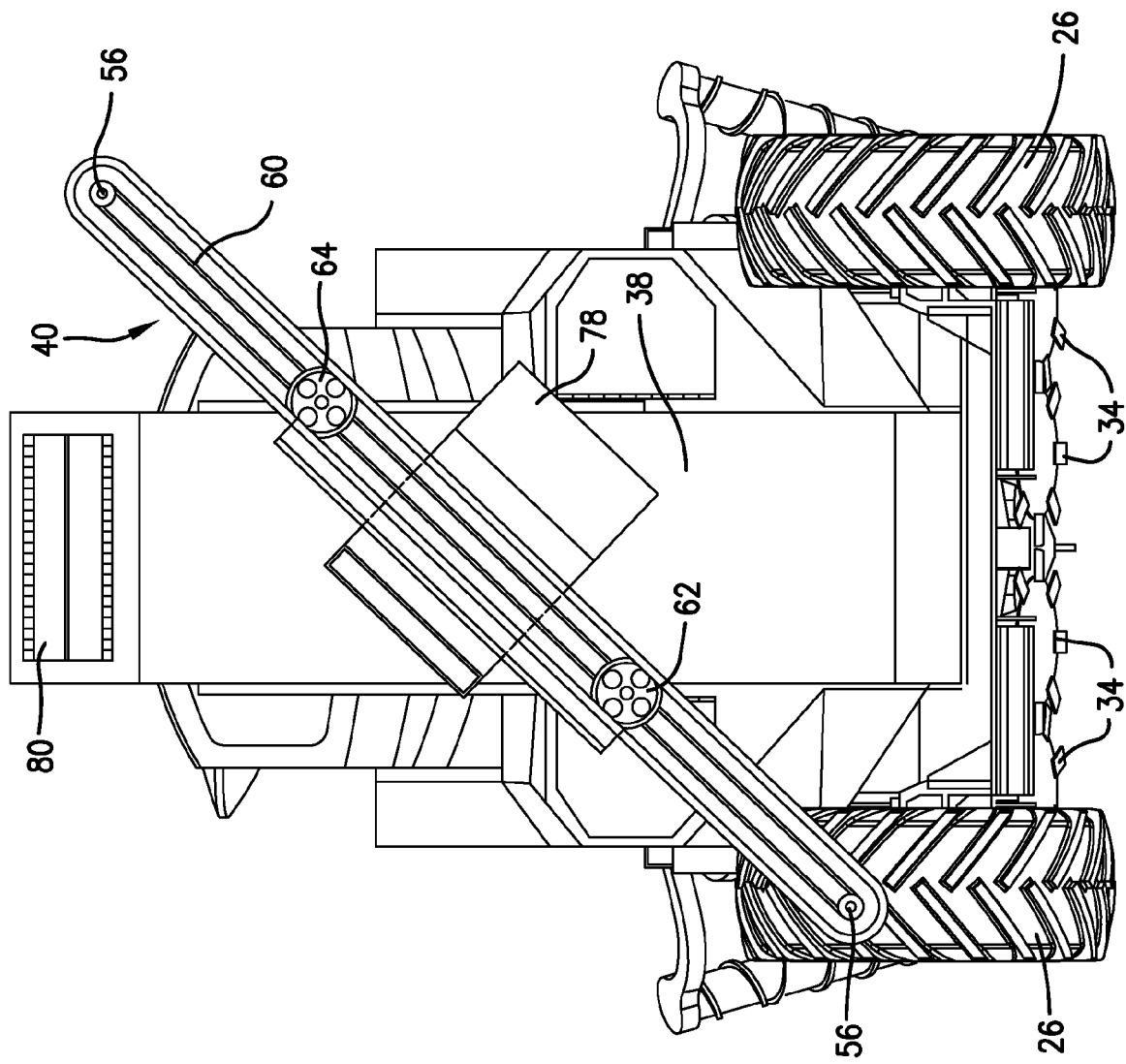
FIG. 8 is a rear view of the sugarcane harvester with its discharge conveyor shifted to a transport/storage position.
Figure 9:
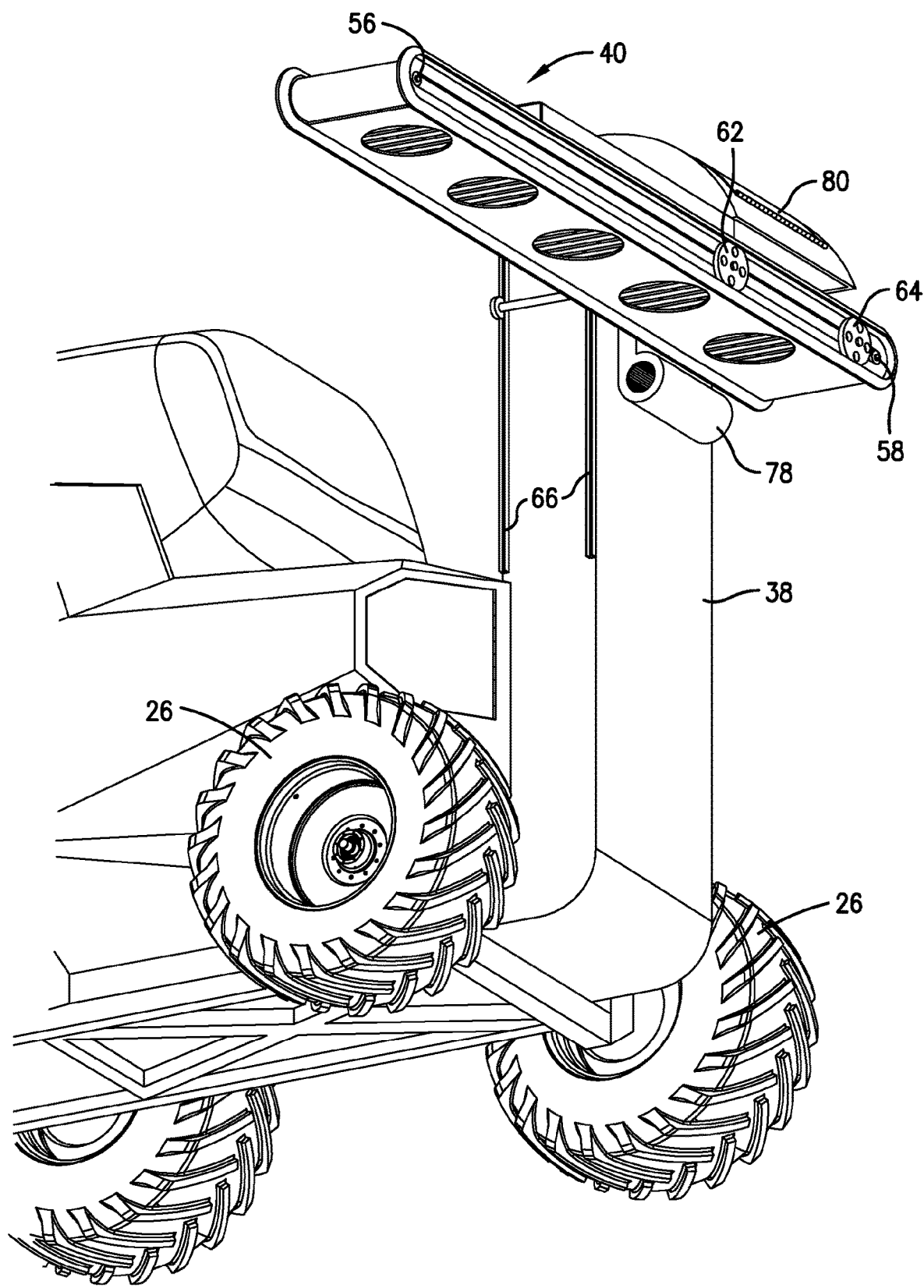
FIG. 9 is a fragmentary bottom rear perspective view of the sugarcane harvester.

The height adjustment mechanism may also selectively raise or lower the left and right ends of the conveyor 40 independently of one another. For example, the mechanism may shift the right side shaft 64 down relative to the left side shaft 62 as depicted in FIG. 6 or shift the left side shaft down 62 relative to the right side shaft 64 as depicted in FIGS. 7 and 8. This permits an operator to adjust an angle of the conveyor 40 with respect to the ground upon which the harvester is positioned so as to convey the billets downwardly to a wagon on either side of the harvester.

The discharge assembly 20 also comprises lateral adjustment mechanism for laterally adjusting positions of the conveyor. The lateral adjustment mechanism may be part of the height adjustment mechanism or may include separate motors, pneumatic cylinders, actuators, or any other electrical, mechanical, electromechanical, or pneumatic components capable of shifting the discharge conveyor 40 right or left.

Figure 4:
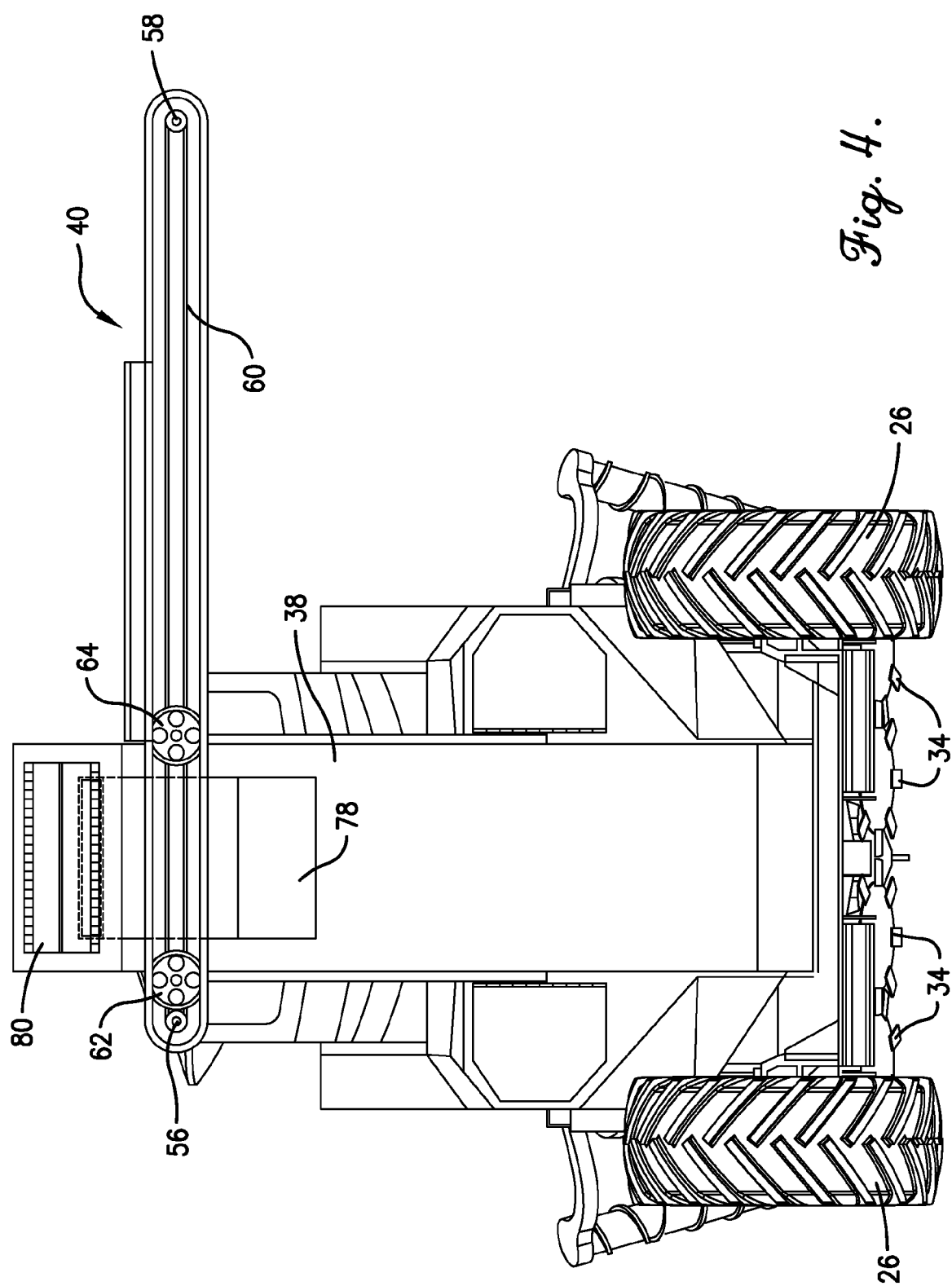
FIG. 4 is a rear view of the sugarcane harvester with its discharge conveyor shifted to its raised and rightmost position.

The lateral adjustment mechanism is operable to shift the conveyor anywhere between a leftmost position depicted in FIGS. 1, 3, 5, and 6 and a rightmost position depicted in FIG. 4. This permits an operator to adjust the lateral position of the discharge conveyor to discharge billets on either the left or right side of the sugarcane harvester.

The lateral adjustment mechanism and height adjustment mechanism may be operated together to first shift the conveyor rightward or leftward and then raise one end relative to the other. For example, the lateral adjustment may shift the conveyor leftward, and the height adjustment mechanism may then lower the right end of the conveyor relative to the left end so that the left end of the conveyor extends upwardly and the right end downwardly as depicted in FIG. 6.

The height adjustment mechanism and the lateral adjustment mechanism may also be cooperatively operated to shift the discharge conveyor between various use positions depicted in FIGS. 1-7 and a transport/storage position depicted in FIG. 8. In some use positions, the conveyor 40 may extend substantially horizontally with respect to the longitudinal axis of the harvester with its ends extending from the left and right sides of the harvester as depicted in FIGS. 1-5. In other use positions, the conveyor 40 may extend at an angle with one of its ends extending beyond the sides of the rear wheels of the harvester as depicted in FIGS. 6 and 7. When in the transport/storage position, the conveyor is angled with respect to the longitudinal axis of the harvester and positioned so that both its ends are within the sides of the rear wheels of the harvester as depicted in FIG. 8 so as to occupy less space on either side of harvester.

The extractor assembly removes leaves, stems, and other waste material from the billets before the billets are discharged from the harvester so that less of the waste material is delivered to a mill. In accordance with important aspects of the invention, the extractor assembly includes several fans or blowers strategically sized and positioned on the harvester to more efficiently and effectively separate the waste material from the billets without blowing the waste material into the wagon or other billet collection vehicle following the harvester.

An embodiment of the extractor assembly comprises a fan 70 or blower positioned between the intake and cutting assembly 14 and the chopping section 16. The fan is positioned above the feed section 36 of the intake and cutting assembly 14 and directs pressurized air downwardly on the sugarcane stalks as they are being fed to the chopping section 16. This separates and removes loose leaves, stems, and other waste material from the sugarcane stalks before the waste material enters and potentially clogs the blades in the chopping section and directs the waste material below the harvester into the sugarcane field.

An embodiment of the discharge assembly also includes a fan 72 or blower positioned between the chopping section 16 and the storage reservoir 18. The fan 72 directs pressurized air upwardly into the billets as they are thrown from the chopping section 16 and suspended in air before landing in the reservoir 18. In one embodiment, the air is directed substantially perpendicular to a direction of travel of the suspended billets as the billets are approximately midway between the chopping section and the storage reservoir. The air then directs the waste material rearwardly through vents 74 in the rear of the harvester. Because the pressurized air is directed at the billets as they are suspended in air rather than against them while they are supported on a conveyor or other solid surface, the air more thoroughly and efficiently separates and removes loose leaves, stems, and other waste material from the billets. This permits use of a smaller, more energy efficient fan. In one embodiment, the fan is rated 100 Watts or smaller.

An embodiment of the discharge assembly also includes ductwork 76 that captures exhaust air from an engine cooling fan and directs the pressurized air into the stream of waste material separated from the billets with the fan 72. This helps direct the waste material rearwardly through the vents 74 in the rear of the harvester.

An embodiment of the discharge assembly also includes a fan 78 or blower positioned near the outlet 44 of the elevator 38. The fan 78 directs pressurized air upwardly into the billets as they are projected from the elevator 38 onto the conveyor 40. The air then directs the waste material rearwardly through vents 80 and away from the conveyor and any wagons or other collection vehicles collecting billets from the conveyor. As best shown in FIG. 10, pressurized air from the fan 78 is directed at the billets as they are suspended in air between the elevator and the conveyor, so the air more thoroughly and efficiently separates and removes loose leaves, stems, and other waste material from the billets. This permits use of a smaller, more energy efficient fan. In one embodiment, the fan is rated 100 Watts or smaller. In one embodiment, the air is directed substantially perpendicular to a direction of travel of the suspended billets as they are approximately midway between the output of the elevator and the conveyor.

Figure 5:
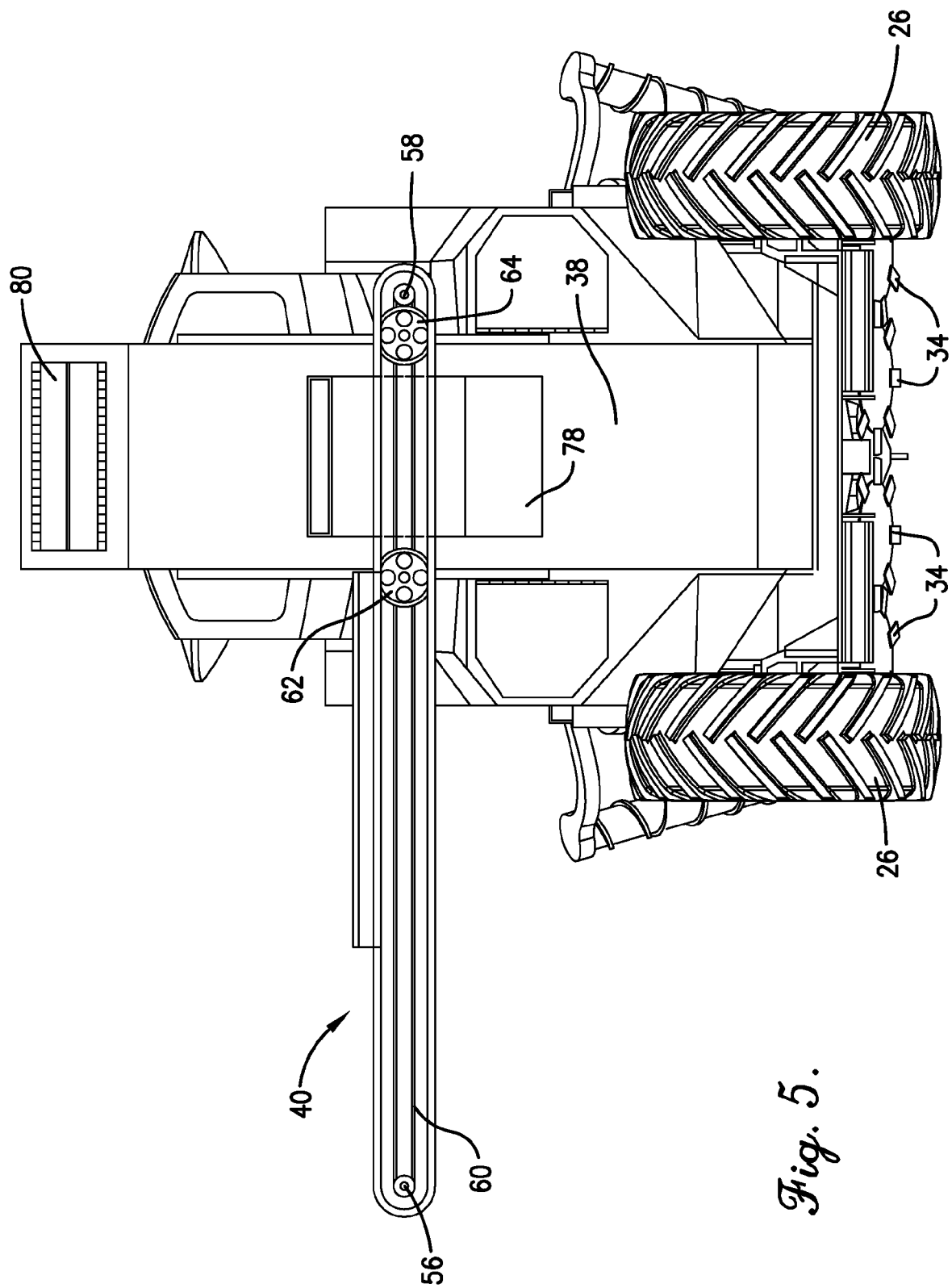
FIG. 5 is a rear view of the sugarcane harvester with its discharge conveyor shifted to a lowered and leftmost position.
Figure 11:
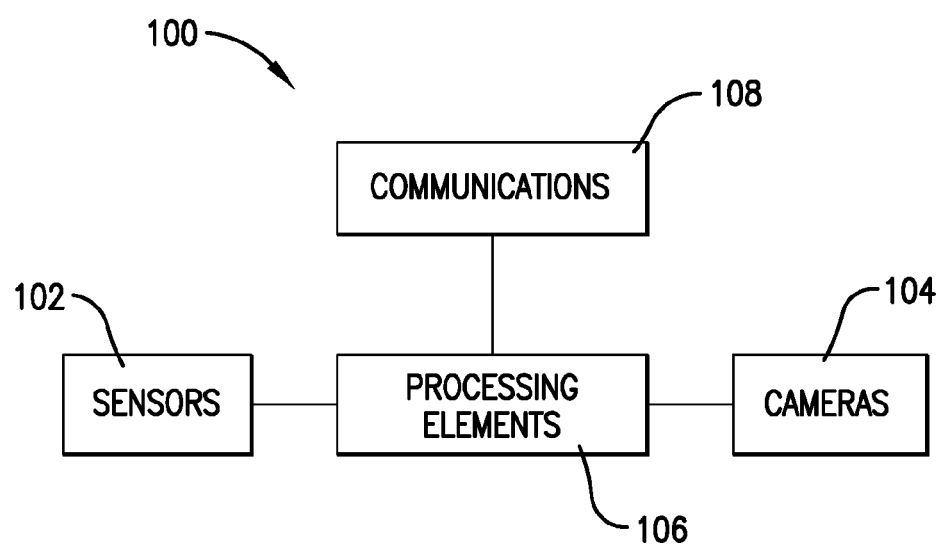
FIG. 11 is a block diagram of an exemplary control system of the sugarcane harvester.

As shown in FIG. 11, the harvester may also comprise a control system 100 for automatically controlling certain functions of the harvester including movement of the conveyor 40 and operation of the fans 70, 72, and 78. The control system 100 may comprise sensors 102, cameras 104, and/or other electronic devices for sensing obstacles near the harvester such as tree limbs, fence posts, etc. and processing elements 106 for receiving data and/or signals from the sensors 102 and cameras 14 and automatically operating the height adjustment mechanism and/or the lateral adjustment mechanism in response to the received data and/or signals to prevent the discharge conveyor 40 from striking the obstacles. For example, the control system may sense a tree limb on the right side of the harvester and automatically shift the discharge conveyor 40 leftward as depicted in FIG. 3 or 5.

The control system may also sense when billets are being collected and where they are in the harvester and operate the appropriate fans 70, 72, and 78. For example, the sensors may determine that the harvester is currently not harvesting additional sugarcane but is discharging previously harvested billets, and the processing elements therefore turn off fans 70 and 72 but turn on fan 78. In another example, the sensors may sense that the harvester is harvesting new sugarcane but is not discharging billets from the harvester, and the processing elements may therefore turn on fans 70, 72 and turn off fan 78.

The processing elements 106 may be programmed with logic or a number of routines, subroutines, applications, or instructions for performing the instructions described herein. The control system 100 may also comprise communication elements 108 for sending data representative of positions of the discharge conveyor 40 and operating states of the fans 70, 72, and 78 to remote control devices and for receiving instructions from the remote devices to remotely adjust the positions of the discharge conveyor 40 or operations of the fans. The control system 100 may also automatically shift the conveyor 40 to its transport/storage position and turn off all the fans whenever the harvester is not harvesting sugarcane and shift the conveyor 40 to one of its use positions and turn on some of the fans whenever the harvester is harvesting sugarcane. The control system 100 may also sense the position and/or size of a wagon or other storage vehicle following the harvester and automatically shift the conveyor 40 to the appropriate use position. For example, the control system may sense a wagon on its left side and automatically shift the discharge conveyor 40 to the use position depicted in FIG. 3. As another example, the control system may sense a relatively short wagon on its left side and automatically shift the discharge conveyor 40 to the use position depicted in FIG. 5.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein, such as the methods of automatically positioning the conveyor assembly 36, may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A sugarcane harvester for harvesting sugarcane stalks from sugarcane plants, the sugarcane harvester comprising:
    an intake and cutting assembly for cutting the sugarcane stalks from the sugarcane plants as the sugarcane harvester moves through the sugarcane plants;
    a chopping section for receiving the sugarcane stalks from the intake and cutting assembly, chopping the sugarcane stalks into billets, and projecting the billets from an outlet of the chopping section;
    a storage reservoir in which the billets land and are temporarily stored after being projected from the chopping section; and
    an extractor assembly including a source of pressurized air positioned between the chopping section and the storage reservoir that directs pressurized air upwardly into the billets as the billets are projected from the chopping section and suspended before landing in the reservoir to remove waste material from the billets and direct the debris rearwardly out of the sugarcane harvester.

2. The sugarcane harvester as set forth in claim 1, further comprising an engine and an engine cooling fan, the extractor assembly further comprising ductwork that captures pressurized exhaust air from the engine cooling fan and directs the pressurized exhaust air into the waste material separated from the billets with the source of pressurized air positioned between the chopping section and the storage reservoir to help direct the waste material rearwardly out of the harvester.

3. The sugarcane harvester as set forth in claim 1, the extractor assembly further comprising a source of pressurized air positioned between the intake and cutting assembly and the chopping section that directs pressurized air downwardly on the sugarcane stalks as they are being transported to the chopping section to remove the waste material from the sugarcane stalks before the sugarcane stalks are cut into the billets by the chopping section.

4. The sugarcane harvester as set forth in claim 3, wherein the source of pressurized air positioned between the intake and cutting assembly and the chopping section is a radial fan.

5. The sugarcane harvester as set forth in claim 1, further comprising a discharge assembly including:
   an elevator for receiving the billets from the chopping section and elevating the billets; and
   a conveyor for receiving the billets from the elevator, moving the billets substantially horizontally, and discharging the billets to a wagon or other storage vehicle or mechanism.

6. The sugarcane harvester as set forth in claim 5, the discharge assembly further comprising height adjustment mechanism for vertically raising or lowering a height of the conveyor.

7. The sugarcane harvester as set forth in claim 5, the discharge assembly further comprising lateral adjustment mechanism for laterally adjusting positions of the conveyor relative to the elevator.

8. The sugarcane harvester as set forth in claim 5, wherein the elevator elevates the billets substantially vertically.

9. The sugarcane harvester as set forth in claim 8, wherein the conveyor moves the billets in a direction substantially perpendicular to the elevator and a longitudinal axis of the sugarcane harvester.

10. The sugarcane harvester as set forth in claim 1, wherein the source of pressurized air positioned between the chopping section and the storage reservoir is a radial fan.

11. The sugarcane harvester as set forth in claim 1, further comprising a movable chassis on which the intake and cutting assembly, the chopping section, the storage reservoir, and the extractor assembly are mounted.

12. A sugarcane harvester for harvesting sugarcane stalks from sugarcane plants, the sugarcane harvester comprising:
   a movable chassis having a forward end and a rearward end disposed along a longitudinal axis;
   an intake and cutting assembly mounted on the forward end of the chassis for cutting the sugarcane stalks from the sugarcane plants as the sugarcane harvester moves through the sugarcane plants;
   a chopping section mounted between the forward end and rearward end of the chassis for receiving the sugarcane stalks from the intake and cutting assembly and chopping the sugarcane stalks into billets;
   a discharge assembly positioned near the rearward end of the chassis, the discharge assembly comprising:
      an elevator for receiving the billets from the chopping section and vertically lifting the billets about a vertical elevator axis that is substantially perpendicular to the longitudinal axis of the moveable chassis and projecting the billets from an outlet of the elevator; and
      a conveyor for receiving the billets projected from the outlet of the elevator, moving the billets substantially horizontally about a horizontal conveyor axis that is perpendicular to both the vertical elevator axis and the longitudinal axis of the moveable chassis, and discharging the billets to a wagon or other storage vehicle or mechanism; and
   an extractor assembly including a source of pressurized air positioned between the chopping section and the storage reservoir that directs pressurized air upwardly into the billets as the billets are thrown from the chopping section and suspended in air before landing in the reservoir to remove waste material from the billets and direct the debris rearwardly out of the sugarcane harvester.

13. The sugarcane harvester as set forth in claim 12, further comprising an engine and an engine cooling fan, the extractor assembly further comprising ductwork that captures pressurized exhaust air from the engine cooling fan and directs the pressurized exhaust air into the waste material separated from the billets with the source of pressurized air positioned between the chopping section and the storage reservoir to help direct the debris rearwardly out of the harvester.

14. The sugarcane harvester as set forth in claim 12, the extractor assembly further comprising a source of pressurized air positioned between the intake and cutting assembly and the chopping section that directs pressurized air downwardly on the sugarcane stalks as they are being transported to the chopping section to remove the waste material from the sugarcane stalks before the sugarcane stalks are cut into the billets by the chopping section.

15. The sugarcane harvester as set forth in claim 14 wherein the source of pressurized air positioned between the intake and cutting assembly and the chopping section is a radial fan.

16. The sugarcane harvester as set forth in claim 12, wherein the source of pressurized air positioned between the chopping section and the storage reservoir is a radial fan.

17. A sugarcane harvester for harvesting sugarcane stalks from sugarcane plants, the sugarcane harvester comprising:
   a movable chassis having a forward end and a rearward end disposed along a longitudinal axis;
   an engine;
   an engine cooling fan;
   an intake and cutting assembly mounted on the forward end of the chassis for cutting the sugarcane stalks from the sugarcane plants as the sugarcane harvester moves through the sugarcane plants;
   a chopping section mounted between the forward end and rearward end of the chassis for receiving the sugarcane stalks from the intake and cutting assembly and chopping the sugarcane stalks into billets;
   a discharge assembly positioned near the rearward end of the chassis, the discharge assembly comprising:
      an elevator for receiving the billets from the chopping section, vertically lifting the billets about a vertical elevator axis that is substantially perpendicular to the longitudinal axis of the moveable chassis, and projecting the billets from an outlet of the elevator;

a conveyor for receiving the billets projected from the outlet of the elevator, moving the billets substantially horizontally about a horizontal conveyor axis that is perpendicular to both the vertical elevator axis and the longitudinal axis of the moveable chassis, and discharging the billets to a wagon or other storage vehicle or mechanism; and an extractor assembly comprising:
- a source of pressurized air positioned between the intake and cutting assembly and the chopping section that directs pressurized air downwardly on the sugarcane stalks as they are being transported to the chopping section to remove waste material from the sugarcane stalks before the sugarcane stalks are cut into the billets by the chopping section;
- a source of pressurized air positioned between the chopping section and the storage reservoir that directs pressurized air upwardly into the billets as the billets are thrown from the chopping section and suspended in air before landing in the reservoir to remove the waste material from the billets and direct the debris rearwardly out of the sugarcane harvester; and
- ductwork that captures pressurized exhaust air from the engine cooling fan and directs the pressurized exhaust air into the debris separated from the billets with the source of pressurized air positioned between the chopping section and the storage reservoir to help direct the waste material rearwardly out of the harvester.

18. The sugarcane harvester as set forth in claim 17, wherein the source of pressurized air positioned between the chopping section and the storage reservoir is a radial fan.

19. The sugarcane harvester as set forth in claim 17, wherein the source of pressurized air positioned between the intake and cutting assembly and the chopping section is a radial fan.

20. The sugarcane harvester as set forth in claim 17, further comprising:
- height adjustment mechanism for vertically raising or lowering a height of the conveyor; and
- lateral adjustment mechanism for laterally adjusting positions of the conveyor relative to the elevator.

* * * * *